(12) United States Patent
Ai et al.

(10) Patent No.: US 10,591,804 B2
(45) Date of Patent: Mar. 17, 2020

(54) QUANTUM WAVE-CONVERTER

(71) Applicant: Luminit LLC, Torrance, CA (US)

(72) Inventors: Jun Ai, Torrance, CA (US); Fedor Dimov, Torrance, CA (US); Xiaowei Xia, Torrance, CA (US); Selim Shahriar, Torrance, CA (US); Russell Kurtz, Torrance, CA (US); Chris Griffo, Torrance, CA (US)

(73) Assignee: Luminit LLC, Torrance, CA (US)

( * ) Notice: Subject to any disclaimer, the term of this patent is extended or adjusted under 35 U.S.C. 154(b) by 0 days.

(21) Appl. No.: 15/085,681

(22) Filed: Mar. 30, 2016

(65) Prior Publication Data

US 2016/0291442 A1    Oct. 6, 2016

Related U.S. Application Data

(60) Provisional application No. 62/140,198, filed on Mar. 30, 2015.

(51) Int. Cl.
| | | |
|---|---|---|
| *G02F 1/35* | (2006.01) | |
| *H04J 14/02* | (2006.01) | |
| *H04B 10/25* | (2013.01) | |
| *G02B 5/32* | (2006.01) | |
| *G02F 1/365* | (2006.01) | |
| *G02B 6/293* | (2006.01) | |

(52) U.S. Cl.
CPC ............ *G02F 1/3534* (2013.01); *G02B 5/32* (2013.01); *G02B 6/2931* (2013.01); *G02F 1/365* (2013.01); *H04B 10/2503* (2013.01); *H04J 14/02* (2013.01)

(58) Field of Classification Search
CPC .......... G02F 1/3534; H04J 14/02; G02B 5/32
USPC ........................ 385/14–16, 24, 147, 37, 122; 359/326–332; 398/140; 372/21, 22, 46, 372/50
See application file for complete search history.

(56) References Cited

U.S. PATENT DOCUMENTS

| | | | | |
|---|---|---|---|---|
| 3,573,362 A * | 4/1971 | Burchardt | ............ | G03H 1/0404 348/40 |
| 3,585,393 A * | 6/1971 | Duguay | ................ | G04F 13/026 324/120 |
| 5,343,327 A * | 8/1994 | Chai | ...................... | G02F 1/3551 252/584 |
| 5,606,434 A * | 2/1997 | Feldman | ............ | G02B 27/4288 359/15 |
| 5,963,359 A * | 10/1999 | Shinozaki | ................ | G02B 3/06 359/326 |
| 6,069,987 A * | 5/2000 | Sasaki | .................. | G02B 6/4246 385/24 |
| 6,591,047 B2 * | 7/2003 | Malomed | ........... | H04B 10/2543 385/122 |
| 6,876,487 B1 * | 4/2005 | Marshall | ............... | G02F 1/3534 359/326 |

(Continued)

*Primary Examiner* — Akm E Ullah
(74) *Attorney, Agent, or Firm* — Lathrop GPM LLP

(57) ABSTRACT

A plug-and-play fiber-coupled nonlinear optical quantum wave-converter, optimized for quantum communications, comprises a commercial periodically-poled, waveguide-based, nonlinear optical chip, coupled with a pair of substrate-guided holographic (SGH) wavelength division multiplexers (WDM) and a pair of SGH filters; it offers bidirectional difference frequency conversion (DFG) and sum frequency conversion (SFG) simultaneously in a single packaged device.

8 Claims, 2 Drawing Sheets

(56) References Cited

U.S. PATENT DOCUMENTS

| | | | |
|---|---|---|---|
| 8,038,904 B2 * | 10/2011 | Alekel | C09K 11/7712 117/950 |
| 8,422,119 B1 * | 4/2013 | Keaton | G02F 1/35 359/326 |
| 10,359,736 B2 * | 7/2019 | Popovich | G03H 1/202 |
| 2002/0001110 A1 * | 1/2002 | Metz | A61B 5/1172 359/10 |
| 2002/0031295 A1 * | 3/2002 | Sasaki | G02B 6/12007 385/24 |
| 2002/0085207 A1 * | 7/2002 | Hait | G01B 9/021 356/457 |
| 2002/0135865 A1 * | 9/2002 | Tilleman | G02F 2/004 359/326 |
| 2003/0020975 A1 * | 1/2003 | Metz | G02B 5/32 359/15 |
| 2004/0028089 A1 * | 2/2004 | Shake | H04J 14/0223 14/223 |
| 2005/0018259 A1 * | 1/2005 | Holmes | G02B 5/32 359/3 |
| 2005/0213193 A1 * | 9/2005 | Kurimura | G02F 1/3534 359/326 |
| 2005/0280886 A1 * | 12/2005 | Chou | G02F 1/3544 359/326 |
| 2006/0055993 A1 * | 3/2006 | Kobayashi | G03H 1/02 359/3 |
| 2008/0080044 A1 * | 4/2008 | Okayama | G02F 1/3558 359/332 |
| 2009/0122816 A1 * | 5/2009 | Wagner | H01S 3/1068 372/20 |
| 2009/0251752 A1 * | 10/2009 | Gruhlke | G02B 6/0035 359/15 |
| 2010/0157400 A1 * | 6/2010 | Dimov | G02B 5/188 359/13 |
| 2012/0038973 A1 * | 2/2012 | Martinez, III | G02B 7/00 359/326 |
| 2013/0308956 A1 * | 11/2013 | Meyers | H04B 10/11 398/130 |
| 2015/0055961 A1 * | 2/2015 | Meyers | B82Y 10/00 398/140 |
| 2017/0146458 A1 * | 5/2017 | Huber | G01J 3/10 |
| 2019/0331921 A1 * | 10/2019 | Suzuki | G02B 27/4205 |

* cited by examiner

QUANTUM WAVE-CONVERTER

FIELD OF THE INVENTION

This invention relates to quantum communications and more specifically to secure communication between remote quantum systems.

BACKGROUND OF THE INVENTION

Novel techniques are urgently needed to provide secure quantum communications between neutral atom-based quantum systems situated at different locations. A plug-and-play nonlinear optical conversion device is needed to bridge remote quantum systems through telecommunications fibers. Quantum communications are often generated at wavelengths far from the telecommunications band.

SUMMARY OF THE INVENTION

The subject invention uses nonlinear optics to change the wavelength into the band in use, and to convert the resulting telecommunications-band signals back to the quantum communications wavelength. The device provides highly efficient quantum frequency or wavelength conversion (QFC) in a nonlinear optical material. The device is capable of converting the quantum system band (e.g. Rb D1 line 795 nm, Rb D2 line 780 nm, or Cs D line 852 nm) to a wavelength that can be transmitted with low loss over telecommunications optical fibers using difference frequency generation (DFG), and converting the telecommunication band to the quantum system band using sum frequency generation (SFG). The device uses a long-wave pump source in the short-wave infrared (SWIR) to suppress the QFC noise introduced by the spontaneous parametric down-conversion (SPDC) and spontaneous Raman scattering (SRS) processes. The device is a single bidirectional device performing both DFG and SFG, or two separate devices—one doing the DFG and the other performing the SFG. The product is packaged in a small housing, with plug-and-play fiber-coupled input/output ports. The input coupling efficiency is high for all DFG and SFG inputs.

The invention provides a method for providing secure quantum communications, with two optical sources at least one of which is a laser, having different wavelengths in a single nonlinear optical device such as a poled crystal, which implements a waveguide, implementing SFG and/or DFG possibly in a single unit on these sources to produce radiation at a different wavelength, and filtering the output so only radiation from the produced wavelength results. This method includes using substrate guided holographic optics to combine wavelength and include optical power. Further filtering the output includes the use of SGH (substrate guided holographic) optics. Optical fibers may be used as inputs and outputs.

While a nonlinear optical bulk device offers advantages of higher power and larger apertures, periodically-poled nonlinear optical waveguides (WG) offer enhanced nonlinear efficiency for the three-wave mixing involved in SFG and DFG, since the mode profiles of the three waves are confined to a narrow transverse dimension. The nonlinear mixing efficiency is nearly exponentially proportional to the quasi-phase matched (QPM) interaction length of the waveguide device, compared to linearly proportional for bulk devices, thus the improvement in the conversion efficiency can be up to two to three orders of magnitude higher than bulk devices. However, no existing approach matches the spatial modes of a short wavelength (~800 nm) signal and a long wavelength (~2000 nm) pump with the mode of the input taper filter of the WG. For example, standard WDM systems claim coupling efficiency of 12%-20%. An asymmetric Y-junction will usually convert the signal into the higher $TM_{10}$ waveguide mode while the pump maintained the fundamental $TM_{00}$ mode, making it difficult to satisfy the QPM condition. Current techniques cannot provide sufficient coupling efficiency for all DFG and SFG inputs, and do not meet the requirement for secure quantum communications.

Further the invention includes a device for providing secure quantum communications between systems at different locations, with a multiplexer for combining a signal and a pump at separated wavelengths into a single focused collinear beam; a nonlinear optical crystal for converting the collinear beam to a target wavelength by a sum frequency generator and/or difference frequency generator; and a spectral filter with a passband that includes the target wavelength. The sum frequency generator and difference frequency generator may be combined in a single unit.

CONCISE DESCRIPTION OF THE DRAWINGS

DETAILED DESCRIPTION OF THE DRAWINGS

To address this need, a new, high-efficiency, low-noise, and bidirectional plug-and-play fiber-coupled quantum wave-converter for quantum communications, has been developed. The subject invention is a commercial nonlinear optical waveguide chip, coupled with an innovative substrate guided holographic wavelength division multiplexer (WDM) at the input, and an innovative substrate guided holographic filter at the output. The substrate guided holographic WDM multiplexes the pump and the signal beams, and then couples them to the input of the WG. DFG generates the target telecommunications-band light at the output that is then coupled to the substrate guided holographic filter. The substrate guided holographic filter diffracts only the target light wavelength. Quantum applications are highly sensitive to very small (i.e., single photon) light leakage from Raman scattering, and other unwanted light, including out-of-band radiation, out-of-angle light, and in-band but out-of-angle radiation, which are all rejected by the substrate guided holographic filter because they do not meet its diffraction wavelength and diffraction angle at the same time. The substrate guided holographic filter offers a very high out-of-band and off-angle rejection ratio (over 60 dB). Both the WG devices and the optical fibers can be polished with angled end facets to suppress the interference effects. Thus, the SNR of the signal can be very high. The substrate guided holographic occurs in the opposite direction, where another substrate guided holographic WDM multiplexes the S-band and SWIR beams and couples them to a separate WG. At the output, a separate substrate guided holographic filter picks up the quantum band wavelengths and rejects unwanted light. Both DFG and SFG share the same pump in the SWIR. Thus, the subject invention offers bidirectional DFG and SFG simultaneously in a single plug-and-play packaged device that acts a bridge to provide secure quantum communications between remote quantum systems through telecommunications fibers.

Figure 1:
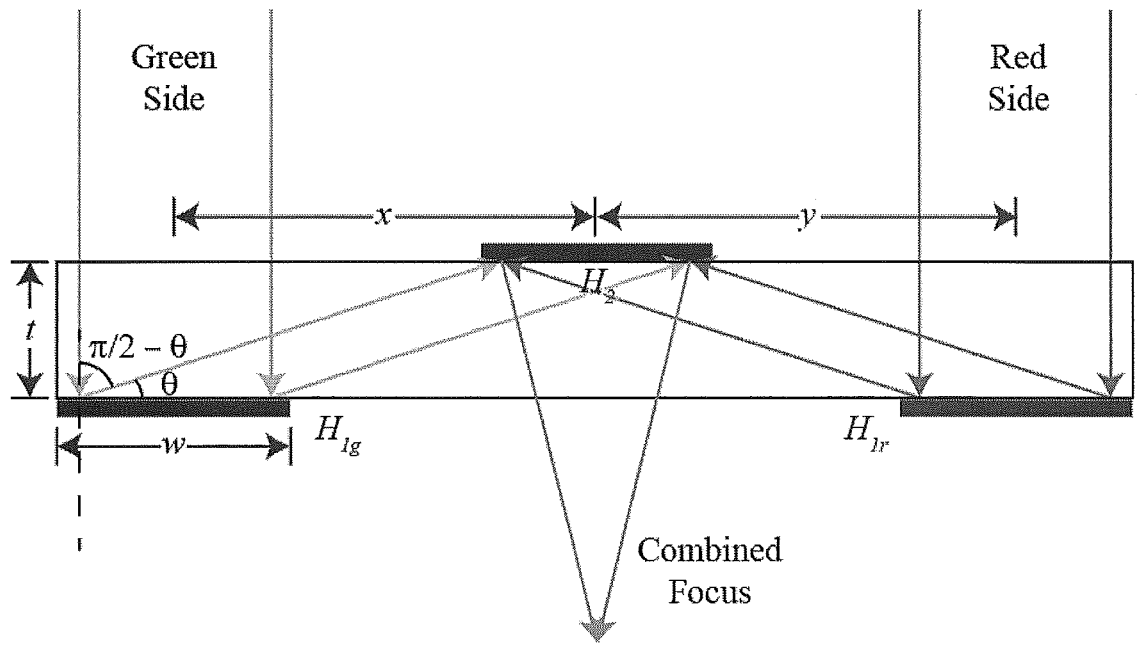
FIG. 1 shows coupling two wavelengths with a substrate guided holographic.

As shown in FIG. 1, the subject invention replaces the WDM couplers with couplers based on a substrate guided holographic, which can take light from the long wavelength ("Red Side") and shorter wavelength ("Green Side") and combine them into a single, collinear beam focused at the same point. Thus, light from the long wavelength is directed at hologram $H_{1r}$, where it is bounced to center hologram $H_2$. Similarly light from the shorter wavelength is directed to hologram $H_{1g}$ where it is bounced to the center hologram $H_2$ and combined with the longer wavelength light and focused to a point (FIG. 2).

In FIG. 2, as applied to the subject invention, the wavelength of the "Red Side" will be the SWIR pump, while the "Green Side" will be the quantum signal for DFG and the telecommunications-band signal for SFG. The resulting coupler will be permanently fabricated on a single light guide, with permanent alignment, excellent out-of-band rejection, and high coupling efficiency.

Each (HOE) hologram is a "thick" HOE, which has significant filtering capabilities. In this implementation, the HOEs have spectral transmission based on a squared sine function:

$$T(\lambda) = \eta \left[ \frac{\sin[2.783(\lambda - \lambda_0)]/\Delta\lambda_{FWHM}}{2.783(\lambda - \lambda_0)/\Delta\lambda_{FWHM}} \right]^2. \quad (2\text{-}1)$$

Using Covestro's Baycol 27-μm photopolymer, the typical value of $\Delta\lambda_{FWHM}$ is 10 nm at 1.0 μm, scaling with wavelength. In addition to the spectral filtering this HOE will have angular acceptance only up to ±0.75° off-axis.

There are four possible layouts for using an substrate guided holographic to combine two wavelengths and focus the two into a small waveguide (FIG. 2).

Figure 2A:
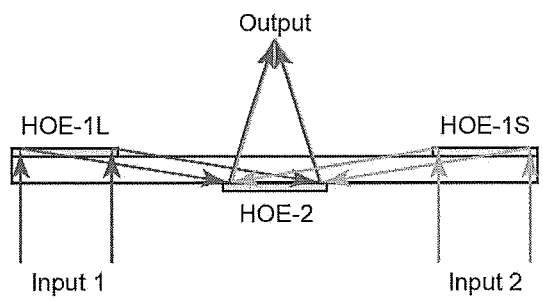
FIGS. 2(a-d) shows four possible beam combining and focusing layouts.
Figure 2B:
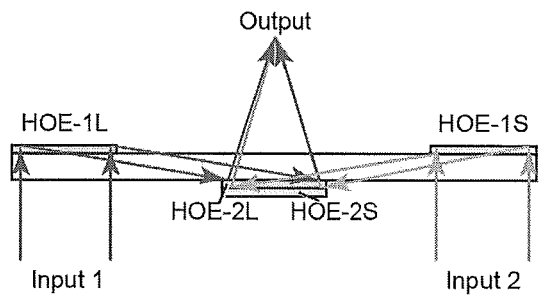
Figure 2C:
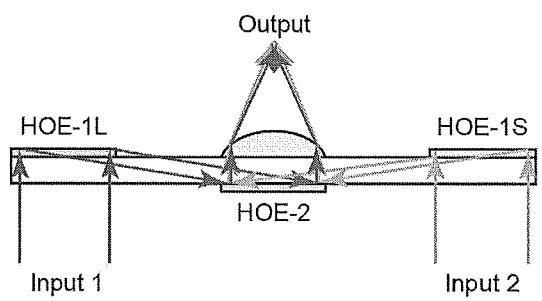
Figure 2D:
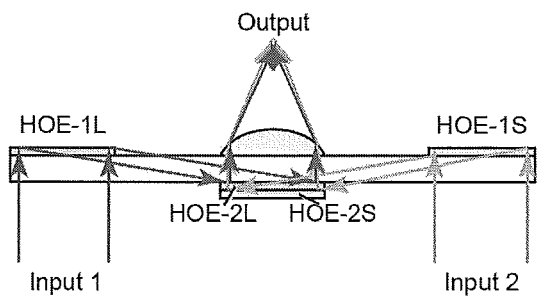

FIG. 2(a) shows a multiplexed lens, FIG. 2(b) shows a separated lens, FIG. 2(c) shows a multiplexed grating, and FIG. 2(d) shows a separated grating.

One embodiment uses individual Bragg grating HOEs with an external lens, as shown in FIG. 2(d).

It will be understood that the foregoing description is of preferred exemplary embodiments of the invention and that the invention is not limited to the specific form shown or described herein. Various modifications may be made in the design, arrangement, and type of elements disclosed herein, as well as the steps of making and using the invention without departing from the scope of the invention as expressed in the appended claims.

The invention claimed is:

1. A secure quantum communications system comprising:
(a) a first light beam comprising a first wavelength from a first optical source to a first hologram adjacent to one end of a substrate-guided-holographic waveguide;
(b) a second light beam comprising a second wavelength different than the first wavelength from a second optical source to a second hologram adjacent to an opposite end of the waveguide;
(c) a third hologram attached to the center of the waveguide;
wherein the first and second light beams bounce from their respective holograms and travel through the waveguide to combine through a third hologram are focused to a point outside the waveguide;
wherein the substrate-guided-holographic waveguide comprises a periodically-poled nonlinear optical device;
wherein the sum frequency generator and difference frequency generator are combined in a single unit;
wherein at least one of the optical sources comprises a laser; and
wherein the substrate-guided-holographic waveguide comprises a spectral filter with a bandpass comprising a target wavelength so only the target wavelength is output.

2. The system of claim 1 wherein the first wavelength comprises a short-wave infrared pump and the second wavelength comprises a quantum signal for difference frequency generation and a telecommunications-band signal for sum frequency generation.

3. The system of claim 1 including the use of optical fibers as inputs and outputs.

4. The system of claim 1 wherein a nonlinear mixing efficiency of the waveguide is nearly exponentially proportional to a quasi-matched interaction length of the waveguide.

5. The system of claim 1 wherein the first and second holograms comprise a thick holographic optical element.

6. The system of claim 1 wherein the holograms include optical power.

7. The system of claim 1 wherein the waveguide comprises a single bidirectional device performing both difference frequency generation and sum frequency generation.

8. The system of claim 1 wherein the third hologram comprises a multiplexed lens, a separated lens, a multiplexed grating, or a separated grating.

* * * * *